United States Patent [19]

Suekane et al.

[11] Patent Number: 5,174,707
[45] Date of Patent: Dec. 29, 1992

[54] THREE-DIMENSIONAL MANUFACTURING AND ASSEMBLY PLANT

[75] Inventors: Masazumi Suekane, Funabashi; Hideki Yamaguchi, Nagareyama, both of Japan

[73] Assignee: Ohbayashi Corp., Osaka, Japan

[21] Appl. No.: 762,804

[22] Filed: Sep. 20, 1991

Related U.S. Application Data

[63] Continuation of Ser. No. 491,853, Mar. 12, 1990, abandoned.

[30] Foreign Application Priority Data

Jun. 30, 1989 [JP] Japan .................................. 1-170626
Sep. 28, 1989 [JP] Japan .................................. 1-250649

[51] Int. Cl.⁵ .................................................. B65G 1/00
[52] U.S. Cl. .................................... 414/269; 414/282; 29/711; 52/646
[58] Field of Search ............... 52/645, 646, 648, 79.1, 52/234, 180, 177, 181, 589; 414/268, 269, 273, 277, 279, 281, 282, 285, 222; 29/564, 711, 564.1

[56] References Cited

U.S. PATENT DOCUMENTS

| | | | |
|---|---|---|---|
| 3,601,937 | 8/1971 | Campbell | 52/79.1 X |
| 3,883,008 | 5/1975 | Castaldi | 414/269 X |
| 4,035,904 | 7/1977 | Ishizaka et al. | 414/273 X |
| 4,136,492 | 1/1979 | Willingham | 52/79.7 |
| 4,459,078 | 7/1984 | Chiantella et al. | 414/279 |
| 4,655,011 | 4/1987 | Borges | 52/79.1 |
| 4,724,640 | 2/1988 | Patane | 52/645 |
| 4,764,078 | 8/1988 | Neri | 414/273 |
| 4,804,307 | 2/1989 | Motoda | 414/273 X |
| 4,807,412 | 2/1989 | Frederiksen | 52/180 X |
| 4,815,190 | 3/1989 | Haba | 414/281 X |
| 4,825,603 | 5/1989 | Hardwicke et al. | 52/630 X |
| 4,890,969 | 1/1990 | Esser | 414/277 |
| 4,919,164 | 4/1990 | Barenburg | 52/79.1 |

FOREIGN PATENT DOCUMENTS

| | | | |
|---|---|---|---|
| 246389 | 12/1960 | Australia | 52/177 |
| 51445 | 5/1982 | European Pat. Off. | 52/177 |
| 55008 | 3/1986 | Japan | 414/269 |
| 185603 | 8/1987 | Japan | 414/273 |
| 8907564 | 8/1989 | PCT Int'l Appl. | 414/273 |
| 529204 | 11/1940 | United Kingdom | 52/177 |

Primary Examiner—Frank E. Werner
Assistant Examiner—James T. Eller, Jr.
Attorney, Agent, or Firm—Wenderoth, Lind & Ponack

[57] ABSTRACT

A three-dimensional manufacturing and assembly plant for installing assembly lines three-dimensionally. The plant comprises a three-dimensional high-rise rack having a plurality of shelves multilayeredly arranged for storing articles and a plurality of multilayered assembly units and provided at least on one side of the three-dimensional rack for supporting assembly lines. The assembly unit includes a plurality of frame members arranged lengthwise and crosswise and a floor detachably placed on the frame members. The floor comprises a plurality of panel members made of transparent and ventilative material. Further, the plant comprises a three-dimensional high-rise rack and having a plurality of shelves multilayeredly arranged for storing articles and an assembly line supporting structure provided at least on one side of the three-dimensional rack for supporting assembly lines. At least one of the three-dimensional rack and the assembly line supporting structure comprises a plurality of cubic modules detachably vertically arranged, and the cubic module comprises a plurality of bar members constructed in the form of a cubic lattice.

20 Claims, 17 Drawing Sheets

FIG. I (B)
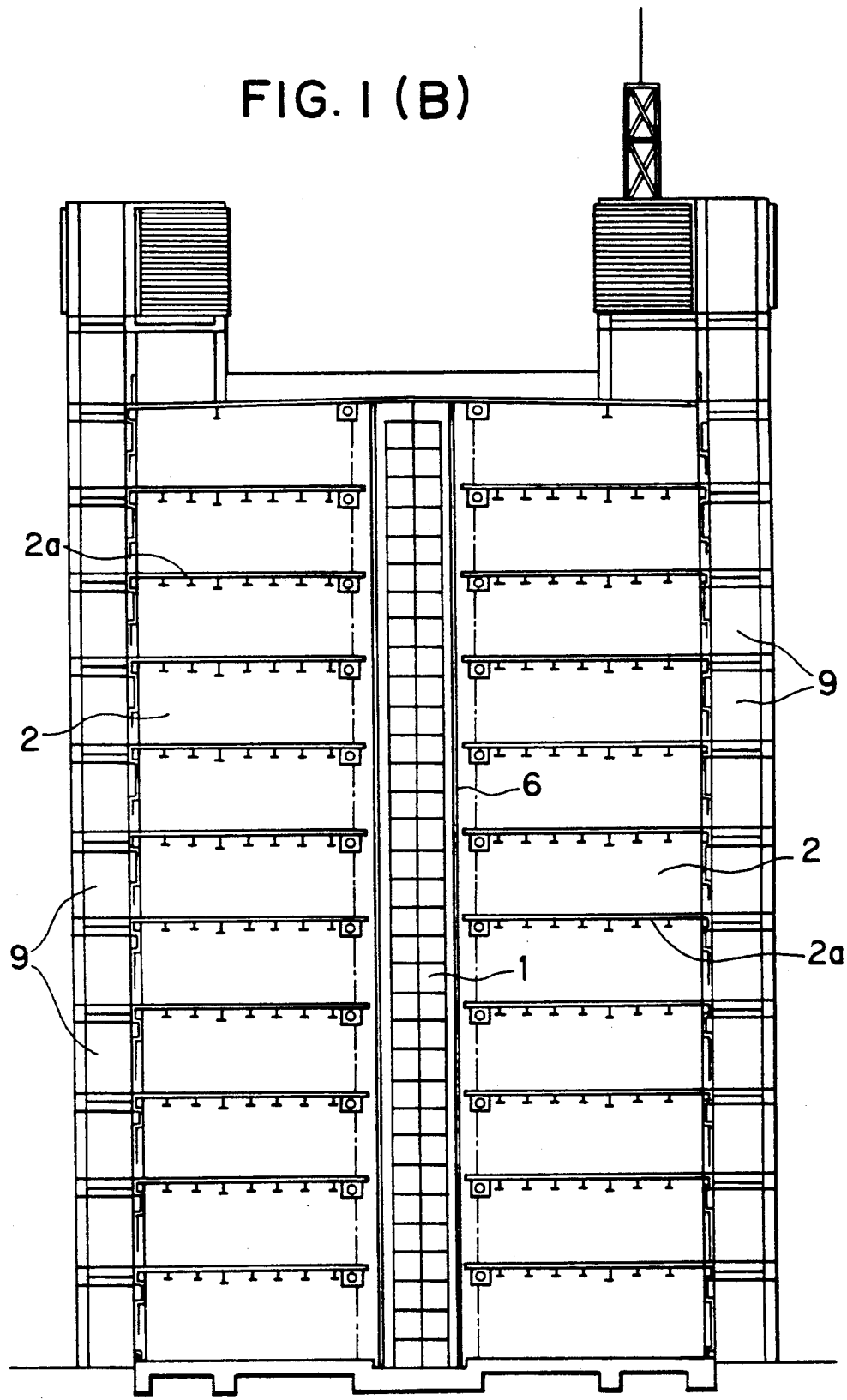

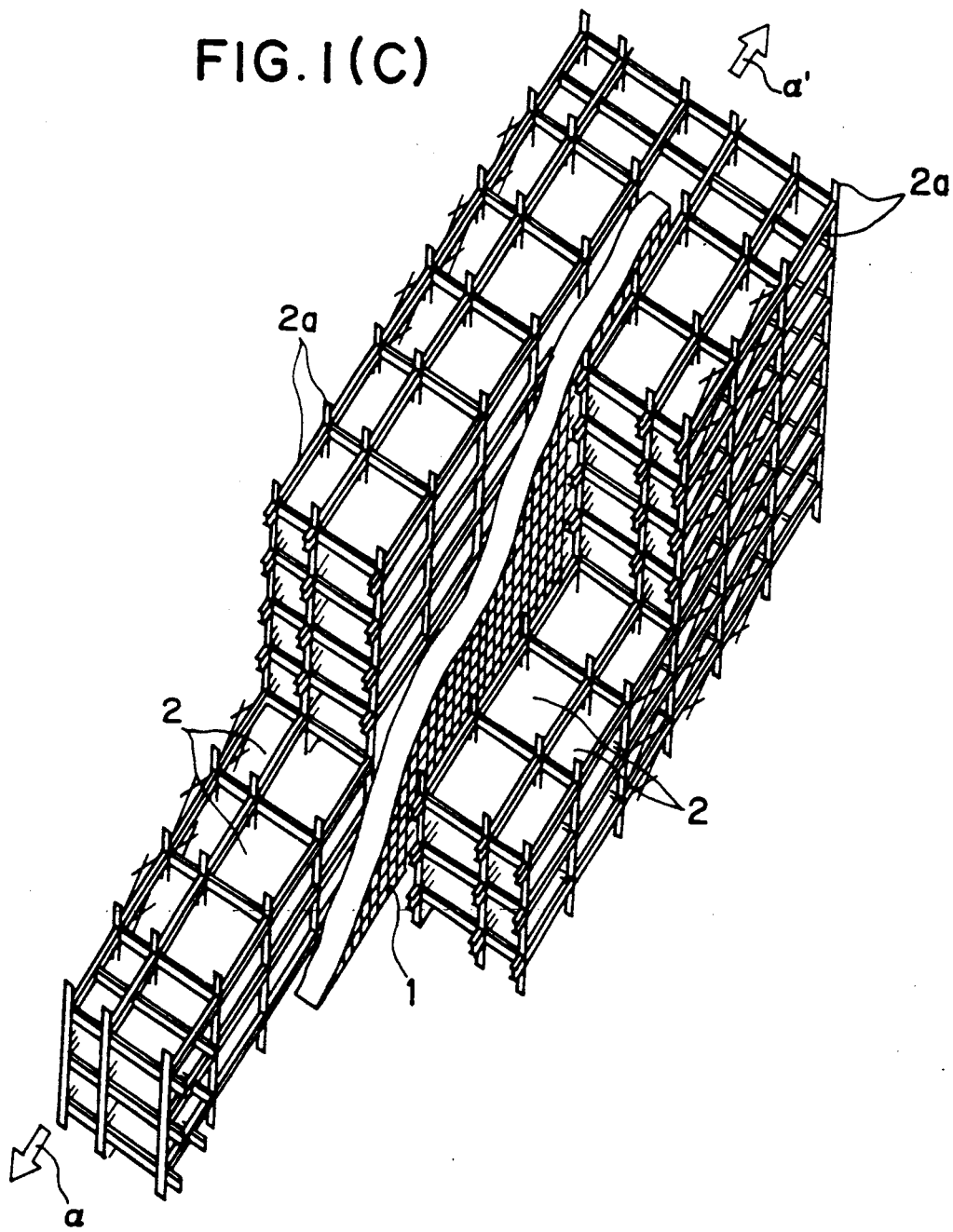

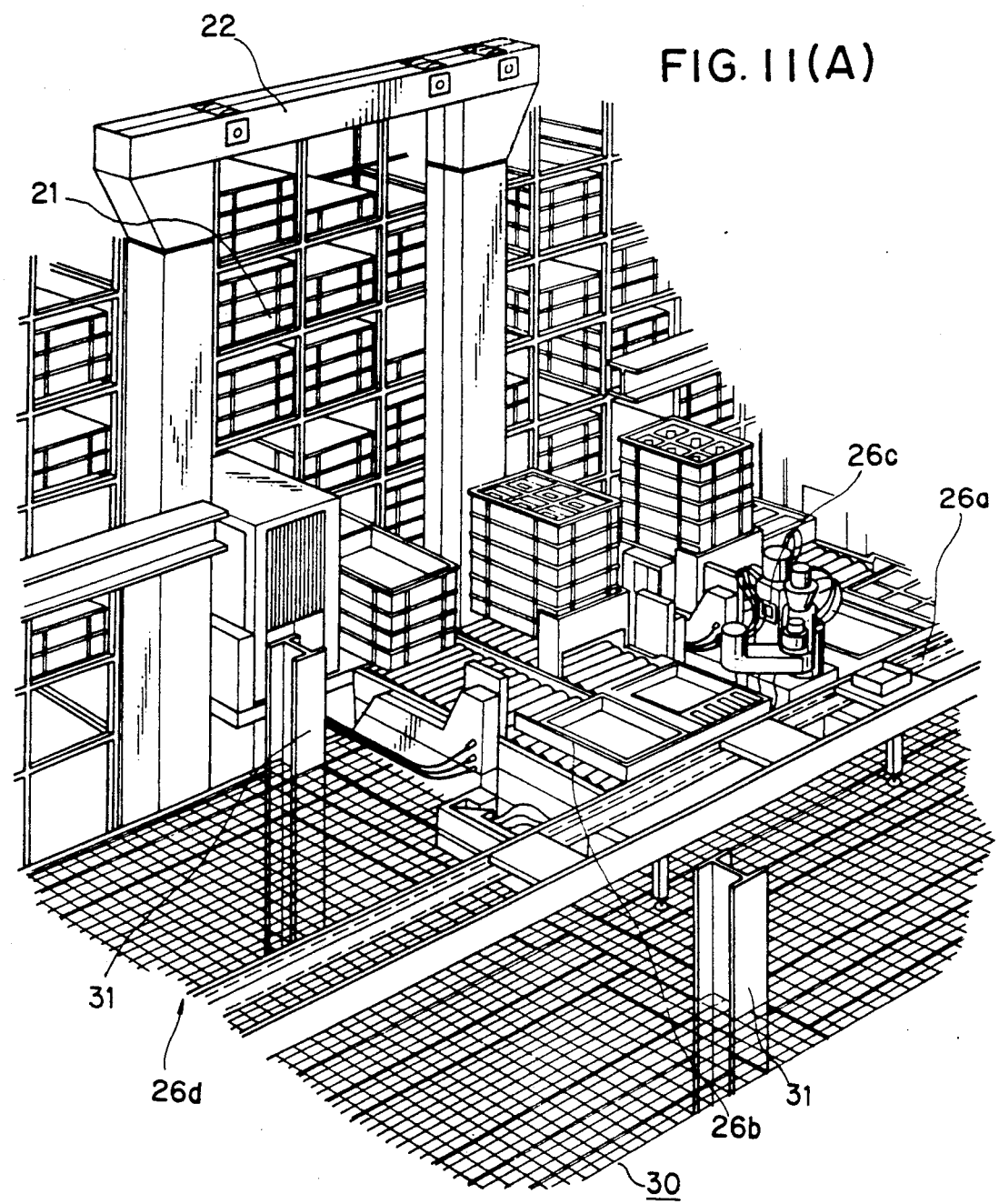

THREE-DIMENSIONAL MANUFACTURING AND ASSEMBLY PLANT

This application is a continuation of now abandoned application Ser. No. 07/491,853, filed on Mar. 12, 1990.

BACKGROUND OF THE INVENTION

The present invention relates to a three-dimensional manufacturing and assembly plant, and more particularly to a three-dimensional manufacturing and assembly plant in which assembly lines can be three-dimensionally positioned and easily modified, maintenance of assembly lines can be easily performed, extension or reconstruction work of the plant can be easily carried out and electrical load of air conditioners can be saved.

Heretofore, in various assembly and manufacturing plants, such as an auto assembly plant or an electric appliances plant, a low building, such as a building of no more than three stories, is generally employed in order to perform assembly line operations smoothly, using belt conveyors.

However, recently, in order to efficiently utilize land, there has been proposed in Japanese Laid-Open Patent Publication No. 56-134162 a plant with a high-rise building, as shown in FIG. 12. A plurality of stories each has an assembly room (A) and a common storage room (B) along at least one side of the assembly rooms (A).

To be more specific, in the conventional plant as shown in FIG. 12, an air conditioner (C), lighting equipment (D) and an assembly line (E) are installed in each assembly room (A), defined by a partition wall (F), a ceiling (G) and a floor (H). A transfer device (I) is provided to transfer parts or articles between each assembly line (E) and the common storage room (B). The transfer of the articles is carried out through an opening (J) formed at a certain position of the partition wall (F). The opening (J) is formed in advance at a predetermined position of the partition wall (F) in accordance with a manufacturing process of the assembly line.

Further, there has been proposed another type of a manufacturing and assembly plant in Japanese Laid-Open Patent Publication No. 48-18879. In this high-rise plant, as shown in FIG. 13, assembly lines (E1)-(E5) are constructed with a high-rise racks (K)-(M). Lifters (N), (O) and (P) for conveying articles are provided between the racks (K)-(M).

With this structure, an article (Q) is lifted up to any floor by, for example, the lifter (N), and inspection or manufacturing of the article (Q) is performed. Then the article (Q) is transferred to any floor of, for example, the high-rise rack (L) by the lifter (O). The above operation will be repeated. That is, the three-dimensional assembly line can be realized with the above structure.

With the above structures, as shown in FIGS. 12 and 13, a plant can be constructed in urban areas where the land prices are high, and an urban type of plant can be constructed adjacent to the areas where consumer cities are located.

However, the above plants with high-rise building structures have given rise to the following problems.

(1) Since each floor is definitely partitioned off by a floor board, such as a floor slab formed integrally with a beam, if a part of the assembly line is three-dimensionally placed, that is, a part of the assembly line extends beyond a floor, the assembly line cannot be freely modified.

(2) An air conditioner must be installed at every floor, therefore not only is the cost of the equipment high, but also the cost of maintenance.

(3) As mentioned above, the opening is formed at a predetermined position in accordance with a manufacturing process of the assembly line. If the assembly line is modified, the opening must be formed at a different position, and thus the partition wall must be replaced with a new one. On the other hand, if the assembly line is modified while taking the existing opening into account, the design of the modification is very difficult.

(4) The modification and transposition of the assembly line requires a lot of time. Further, when new equipment extending beyond a floor is introduced, boring work is required to make a hole in the floor slab in order to avoid contact.

(5) Since built-in floor and wall type buildings, having tall ceilings and a low installation density of the machinery equipment, have been constructed for worker's comfort, the cost of construction and the cost of maintenance of the buildings have risen remarkably.

SUMMARY OF THE INVENTION

It is an object of the present invention to provide a three-dimensional manufacturing and assembly plant which is most suitable for an urban type of plant in which assembly lines can be two- or three-dimensionally arranged and easily modified, maintenance of assembly lines can be easily performed, extension or reconstruction work of the building can be easily carried out and electrical load of air conditioners can be saved.

According to a first aspect of the present invention, there is provided a three-dimensional manufacturing and assembly plant comprising a three-dimensional high-rise rack and having a plurality of shelves for storing articles. The shelves are multilayered and arranged in a vertical direction. A plurality of assembly units are multilayered and provided at least on one side of the three-dimensional rack for storing articles. The assembly unit includes a plurality of frame members arranged lengthwise and crosswise and a floor detachably placed on the frame members, the floor comprising a plurality of panel members made of transparent and ventilative material.

With the above structure, a high-rise three-dimensional rack serves as a warehouse for temporarily storing various parts, such as auto parts, electric parts or other various machinery parts, including the half-processed articles and the finished articles. The assembled units having transparent and ventilative properties are multilayeredly and detachably arranged on one side of the three-dimensional rack and constitute each story of the plant. The assembly lines for assembling the above machinery or the like are constructed on the assembly units. The parts are transferred from the three-dimensional rack to the assembly lines where assembly and manufacturing work is performed, and then the finished article is again stored in the three-dimensional rack. Since the floor surfaces of the assembly units have transparent and ventilative properties, the number of air conditioners and lighting equipment, or the capacity of the air conditioner and intensity of the lighting, can be reduced.

According to a second aspect of the present invention, there is provided a three-dimensional manufacturing and assembly plant comprising a three-dimensional thigh-rise rack and having a plurality of shelves for storing articles. The shelves are multilayered and arranged in a vertical direction. An assembly line supporting structure is provided at least on one side of the three-dimensional rack for supporting assembly lines. At least one of the three-dimensional rack and the assembly line supporting structure comprises a plurality of cubic modules detachably vertically stacked. The cubic module comprises a plurality of bar members constructed in the form of a cubic lattice.

With the above structure, a multilayered three-dimensional rack serves as a warehouse for temporarily storing various parts, such as auto parts, electric parts or other various machinery parts, including the half-processed articles and the finished articles. The assembly line supporting structure provided on one side of the three-dimensional rack constitutes each floor of the plant. The assembly lines for assembling the above machinery or the like are constructed on the assembly line supporting structure. The assembly line supporting structure or the three-dimensional rack are constructed in a manner such that they can be freely constructed or dismantled using a plurality of cubic modules in the form of a cubic lattice. When the assembly lines are required to be enlarged or reduced, the number of the cubic modules is increased or decreased to thereby enlarge or reduce the assembly lines or the three-dimensional rack two- or three-dimensionally. The parts are transferred from the three-dimensional rack to the assembly lines where assembly and manufacturing work is performed, and then the finished articles are again stored in the three-dimensional rack. Since a plurality of the cubic modules constituting the assembly line supporting structure or the three-dimensional rack are constructed in the form of a cubic lattice by bar members such as a steel pipe and have transparent and ventilative properties, the number of air conditioners and lighting equipment, or the capacity of the air conditioner and the intensity of the lighting, can be reduced.

The above and other objects, features and advantages of the present invention will become apparently from the following description when taken in conjunction with the accompanying drawings in which preferred embodiments of the present invention are shown by way of illustrative examples.

BRIEF DESCRIPTION OF THE DRAWINGS

In the drawings:

FIGS. 1(A) through 1(C) show a three-dimensional manufacturing and assembly plant according to a first embodiment of the present invention, FIG. 1(A) being a plan view of the basic layer of the plant, FIG. 1(B) being a cross-sectional view of the plant, and FIG. 1(C) being a perspective view showing frames of the plant;

FIGS. 11(A) and 11(B) are perspective views showing the interior of the basic layer of the plant according to the second embodiment of the present invention, FIG. 11(A) being a partial detail view showing an example of the assembly lines and FIG. 11(B) being a partial detail view showing the utility unit;

DETAILED DESCRIPTION OF THE PREFERRED EMBODIMENTS

A three-dimensional manufacturing and assembly plant according to a first embodiment of the present invention will be described below with reference to FIGS. 1 through 7.

Figure 1A:
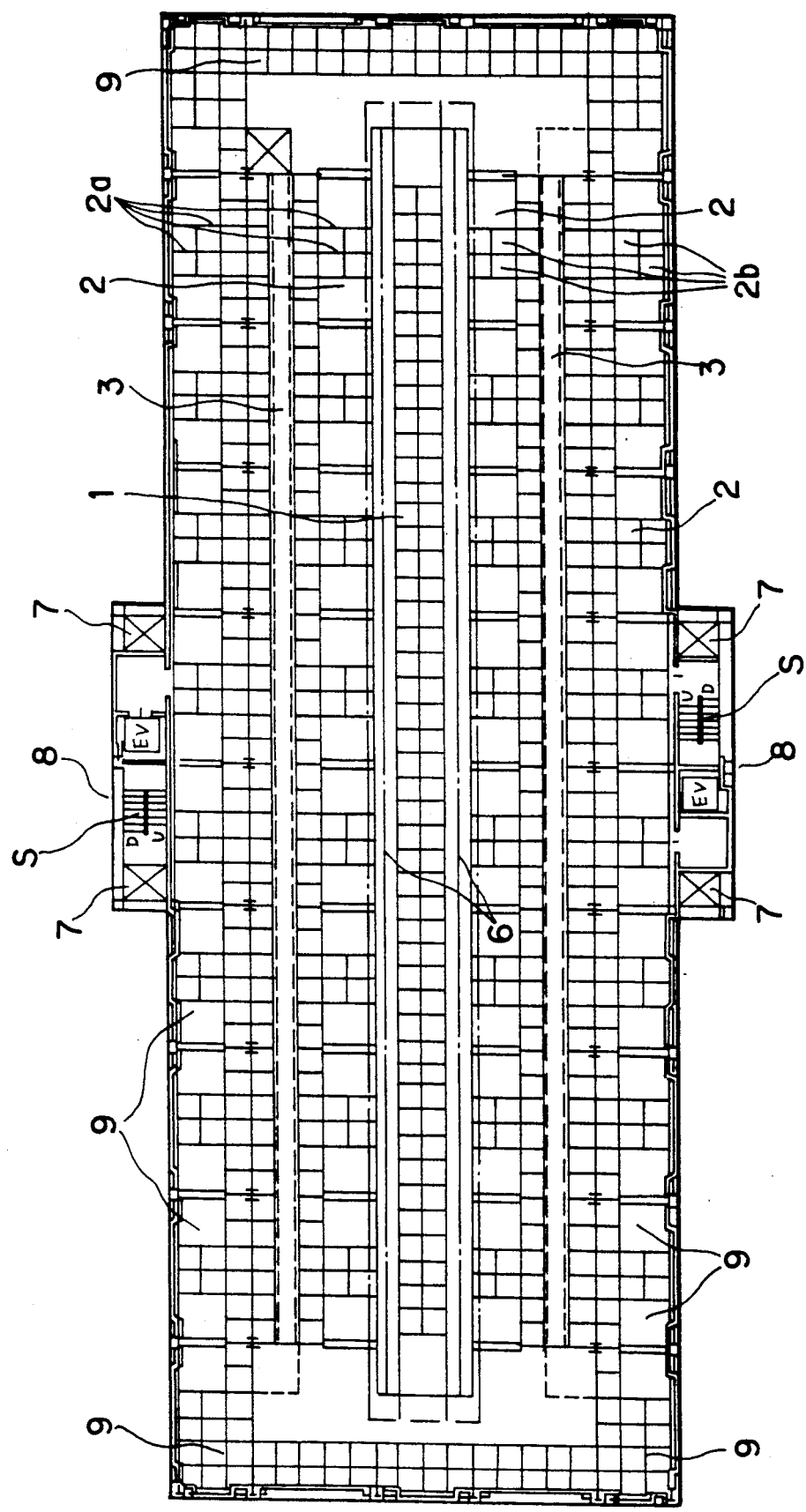

FIGS. 1(A) through 1(C) show a three-dimensional manufacturing and assembly plant according to a first embodiment of the present invention. FIG. 1(A) is a plan view of the basic layer of the plant, FIG. 1(B) is a cross-sectional view of the plant, and FIG. 1(C) is a perspective view showing frames of the plant.

The three-dimensional manufacturing and assembly plant is provided with a high-rise three-dimensional rack 1 at a central portion thereof and a great number of multilayered assembly units 2 placed on both sides of the three-dimensional rack 1 as shown in FIGS. 1(A) through 1(C).

The three-dimensional rack 1 serves as a common storage area with respect to the multilayered assembly units 2. In this embodiment, there is no partition wall between the three-dimensional rack 1 and the assembly units 2.

Figure 2A:
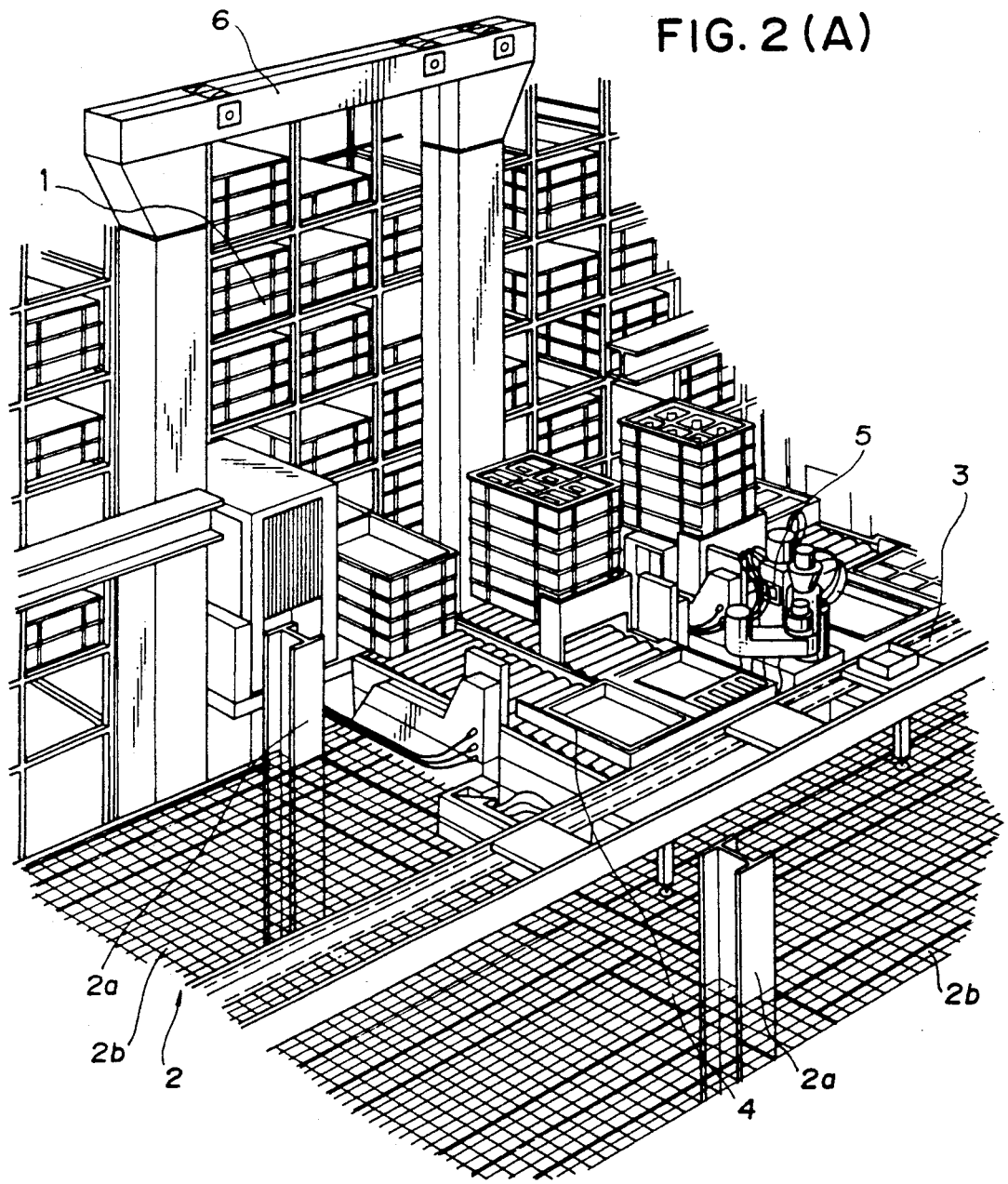
FIGS. 2(A) and 2(B) are perspective views showing the interior of the basic layer of the plant according to the first embodiment of the present invention, FIG. 2(A) being a partial detail view showing an example of assembly lines and FIG. 2(B) being a partial detail view showing a utility unit.

The assembly unit 2 comprises a plurality of steel frames 2a which are arranged lengthwise and crosswise, and a plurality of panel members 2b, detachably placed on the steel frames 2a, which are positioned in a direction parallel to the horizontal beams as shown in FIG. 2(A). The panel members 2b are made of transparent and ventilative material, gratings in this embodiment. The gratings may be replaced with punching members or netting members.

On each layer of the assembly unit 2 thus constructed, there are provided assembly conveyors (free-flow conveyors) 3, parts supplying conveyors 4, assembly robots 5, and other non-illustrated devices, such as inspecting robots or palletizing robots (robot which palletize half-processed articles, or finished articles) which jointly constitute the assembly line.

If equipment, such as the robots, which constitutes the assembly line, or the articles under manufacture, are tall enough to contact the ceiling positioned above the tall equipment or articles, the panel members 2b, which are also the upstairs floor members, are removed to avoid the contact. Even if modification of the assembly lines results in the necessity for rearranging the equipment, only the panel members of the ceiling where contact would occur are removed. Therefore, the design of a modification can be easily effected.

Further, in order to transfer parts from the three-dimensional rack 1 to the parts supplying conveyor 4, or to store the half-processed articles under manufacture or the finished articles assembled and manufactured in the three-dimensional rack 1, a stacking crane 6 is provided between the three-dimensional rack 1 and the assembly units 2 in a manner such that the stacking crane 6 can freely move therebetween in horizontal and vertical directions. At this time, since there is no partition wall between the three-dimensional rack 1 and the assembly units 2, the stacking crane 6 can be stopped at any position to transfer the articles therebetween.

As shown in FIG. 1(A), there are provided partial utility shafts 7 on both sides of the assembly units 2, and connecting units 8 have an elevator EV and stairs S.

Figure 2B:
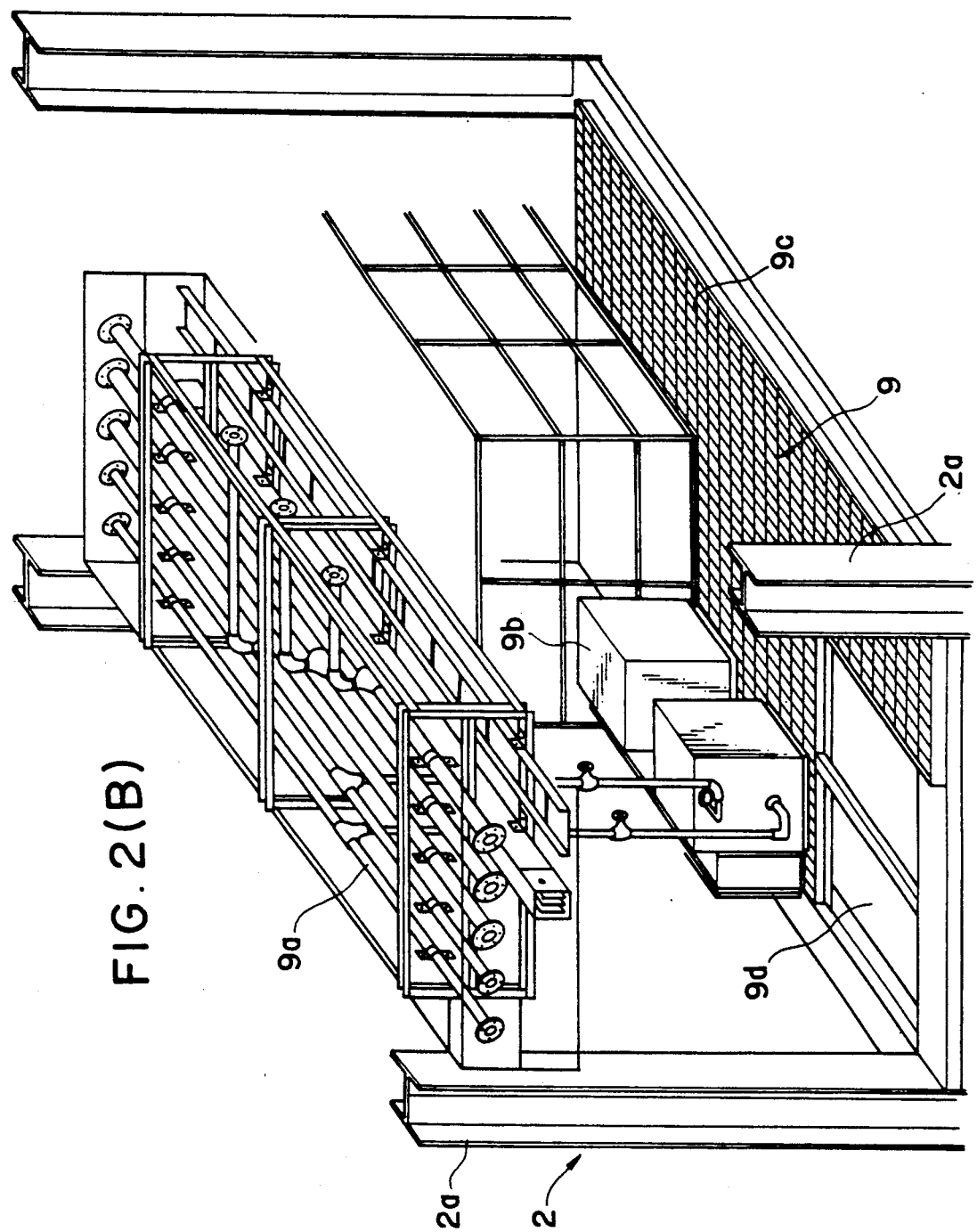

Around each layer of the assembly unit 2, there are provided utility units 9, in which various pipes 9a, including pipes for air conditioners and pipes for cold and hot water, a control board 9b, and ventilation equipment, including conduits and ducts, are highly concentrated, as shown in FIG. 2(B). The utility unit 9 is also provided with a passage 9c for maintaining various equipment in the utility unit 9 and various equipment in the assembly unit 2. The passage 9c comprises panel members made of transparent and ventilative material, such as gratings, punching members or netting members, as well as the panel members 2b in the assembly unit 2, and the panel members in the passage 9c are also detachably installed. The panel members are removed to form a free space 9d as shown in FIG. 2(B). The free space 9d serves as a passage for passing through the equipment which is carried in or out and transferred vertically.

Incidentally, a part of the outer periphery of the assembly unit 2 may be used as the above utility unit 9.

In this embodiment thus constructed, because the various pipings or ducts and the control board are highly concentrated on the utility unit 9, extension, reconstruction, or modification of the manufacturing equipment can be easily performed, and maintenance or inspection of various pipes and the control board or the like can be easily performed. Since the assembly unit 2 and the utility unit 9 are constructed only by placing the panel members on the steel frame, the plant scale can be easily enlarged or reduced. That is, the most suitable plant corresponding to a manufacturing scale can be constructed only by increasing or decreasing the number of the steel frames constituting a framework.

Figure 3:
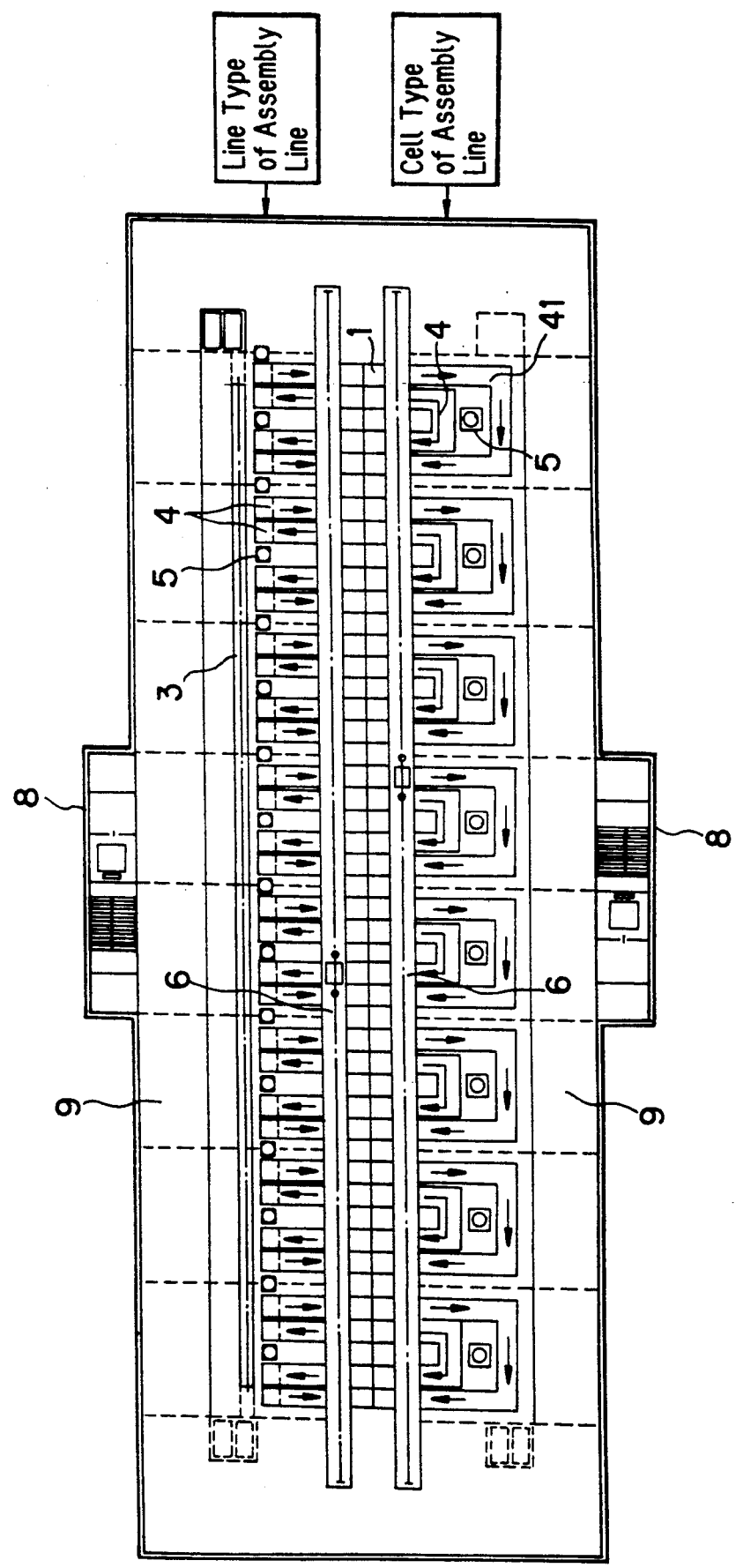
FIG. 3 is a plan view showing an example of the assembly lines of the plant according to the first embodiment of the present invention.

FIG. 3 shows examples of the assembly lines, one of which is a line type of assembly line, seen at the upper portion of FIG. 3, and the other of which is a cell type of assembly line, seen at the lower portion of FIG. 3.

Those parts shown in FIG. 3 which are identical to those shown in FIGS. 1 and 2 are denoted with identical reference numerals.

In the case of the line type of assembly line, assembly robots 5 having a single assembling function are employed. In the case of the cell type of assembly line, assembly robots 5 having multiple assembling functions are employed. The parts supplying conveyor 4 and a chassis supplying conveyor 41 are arranged adjacent to the assembly robot 5 in a manner such that they enclose the assembly robot 5.

Figure 4A:
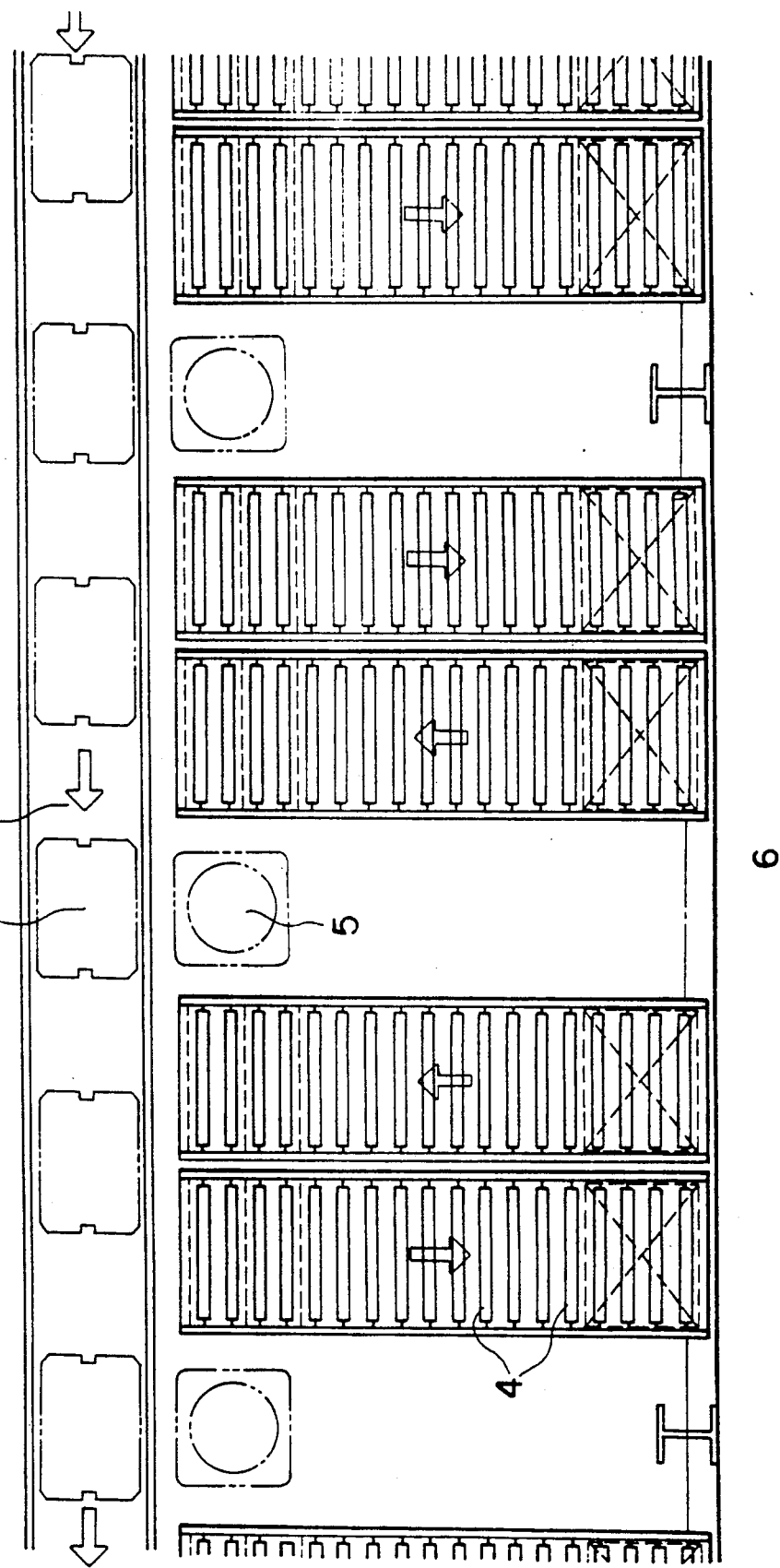
FIGS. 4(A) and 4(B) are partial detail views showing the assembly lines of the plant in FIG. 3, FIG. 4(A) being a plan view of the assembly lines and FIG. 4(B) being a cross-sectional view of the assembly lines.
Figure 4B:
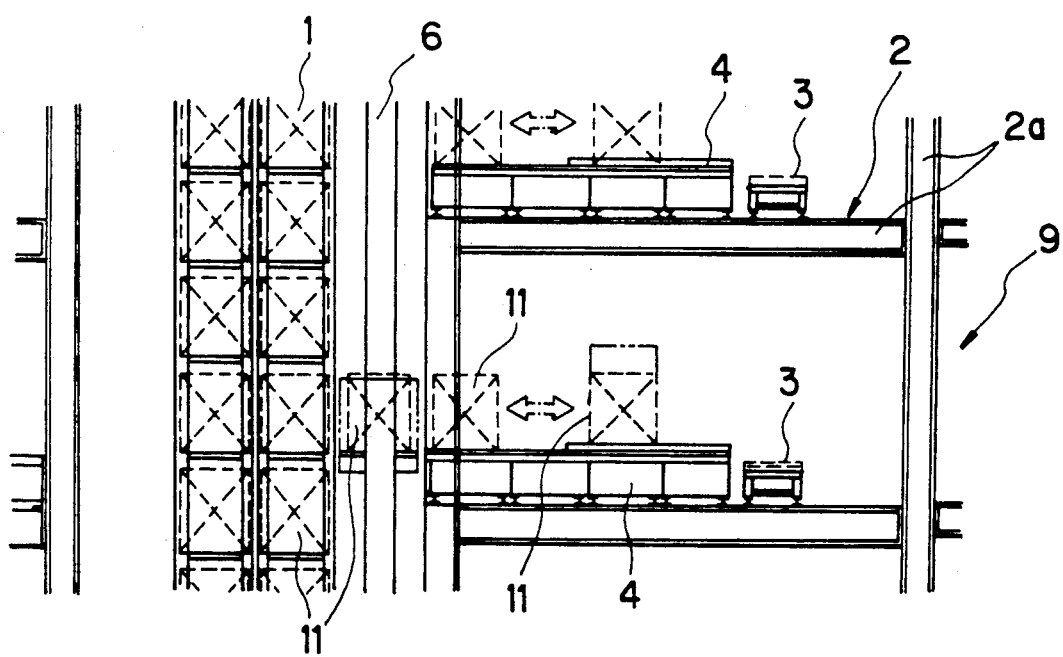

FIGS. 4(A) and 4(B) are partially enlarged detail views of FIG. 3, in which FIG. 4(A) and 4(B) are a plan view and a cross-sectional view, respectively.

In FIGS. 4(A) and 4(B), assembly pallets 10 are placed on the assembly conveyor (free flow conveyor) 3 and conveyed by the assembly conveyor 3. The half-processed articles under manufacture or the finished articles assembled and manufactured are placed on the assembly pallet 10 by the robot 5 having a single assembling function. The parts supplying conveyor 4 performs various operations, including transferring trays 11 onto the stacking crane 6, stacking a plurality of the trays 11, unstacking the trays 11, supplying parts to the robots 5 having a single assembling function, and temporarily storing the trays 11 for buffering.

Figure 5:
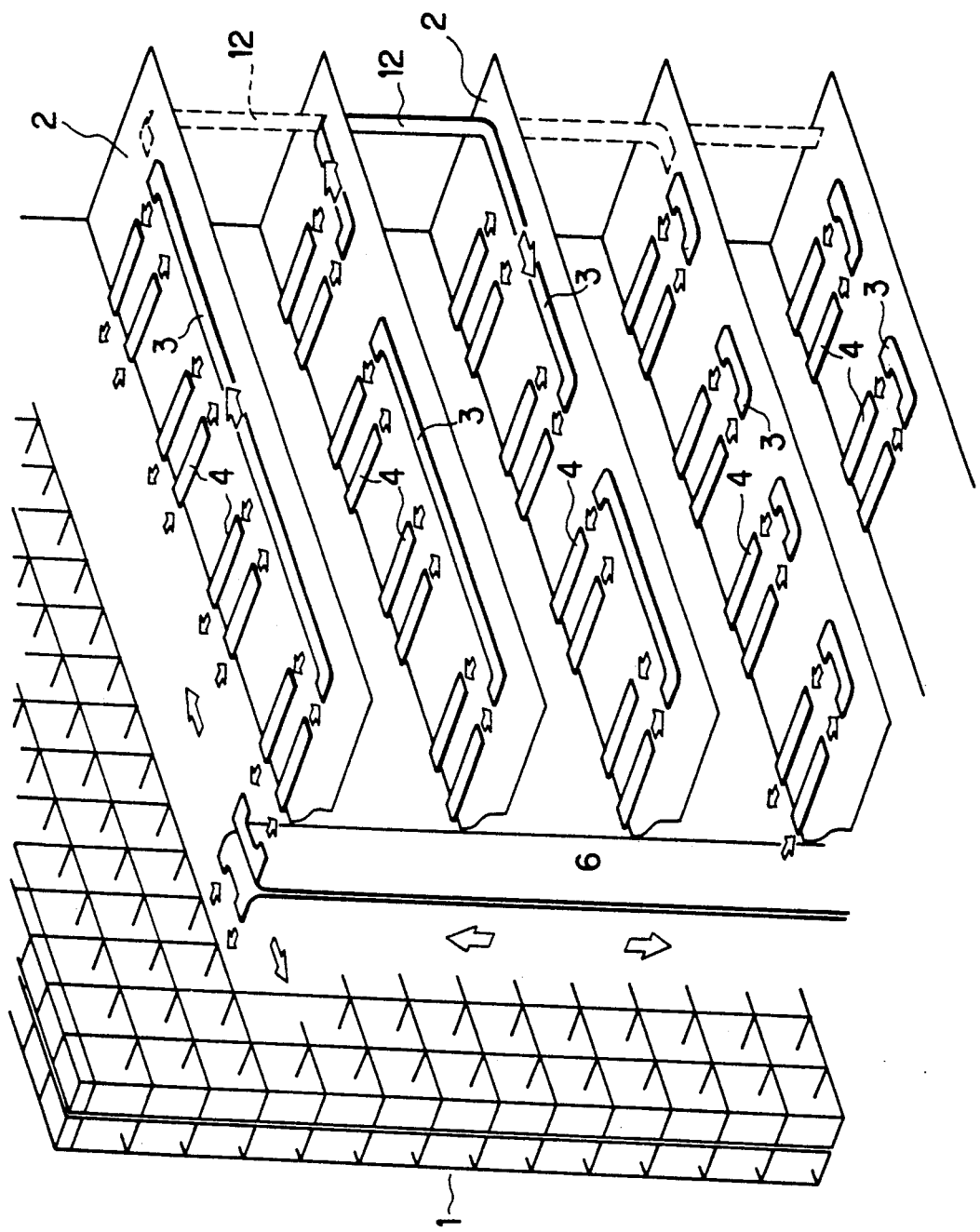
FIG. 5 is a diagrammatically perspective view showing an example of a physical distribution flow according to the first embodiment of the present invention.

FIG. 5 is a perspective view showing an example of a flow of a physical distribution for manufacturing in the three-dimensional manufacturing and assembly plant according to the present invention. A lifter 12 may be provided between each layer of the assembly unit 2 as shown in FIG. 5, whereby one of the assembly lines as shown in FIGS. 3 and 4 is constructed over a plurality of stories (two stories in this embodiment). In this case, the panel members 2b positioned at the location of lifter 12 are removed to form a desired space through which the articles can be moved vertically.

In the case when modification of the assembly lines results in the necessity for rearranging the lifter 12, the panel members positioned at a new setting location (location shown by a broken line in FIG. 5) of the lifter 2 are removed and the lifter 12 is installed at the location. Therefore the modification of the assembly lines can be easily effected. Alternatively, the space where the lifter 12 is currently installed may, if necessary, be closed by placing panel members there.

The above assembly line is constructed by connecting automatic material handling equipment, such as the parts supplying conveyor 4 or the stacking crane 6, with the assembly robots 5 or the robots for inspecting, and palletizing using an advanced information network (not shown). This system is called a CIM system.

Figure 6A:
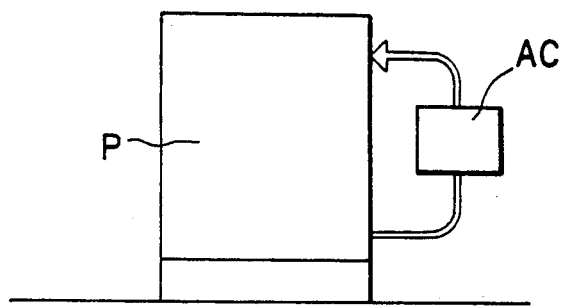
FIGS. 6(A) through 6(C) are schematic views showing air conditioning systems in the plant according to the first embodiment of the present invention, FIG. 6(A) being a schematic view showing a total air conditioning system, FIG. 6(B) being a schematic view showing a partial air conditioning system and FIG. 6(C) being a schematic view showing the total air conditioning system adding to the partial air conditioning system.
Figure 6B:
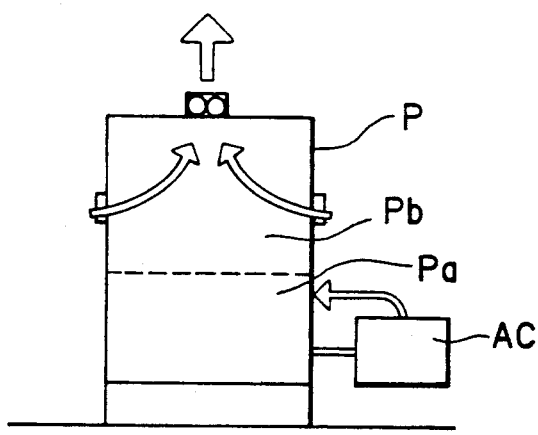
Figure 6C:
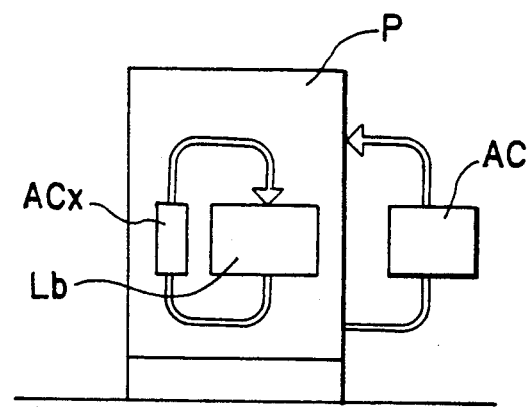

FIGS. 6(A), 6(B) and 6(C) show an air conditioning system in the three-dimensional manufacturing and assembly plant according to the present invention.

In the present invention, since the floor surface of the assembly unit 2 and the utility unit 9 are constructed by the panel members made of ventilative material, the entirety of the plant can be completely air-conditioned by a single air conditioner. In other words, a total air conditioning system can be constructed. In order to air-condition efficiently, however, a partial air conditioning system, which has an air-conditioned space and a ventilated space, can be used jointly in a partial space.

Next, several examples of air conditioning systems will be described below.

FIG. 6(A) shows a total air conditioning system. In this system, air conditioning is effected in a manner such that air inside the plant P is aspirated from the lower part thereof by an air conditioner AC, and air from the air conditioner AC is supplied to upper part of the plant P. Since cold air in upper part of the plant P descends naturally by convection, air is circulated naturally. On the other hand, in winter, the open air outside of the plant is taken into the plant P to effect air conditioning.

FIG. 6(B) shows a partial air conditioning system in which the inside space of the plant is divided into two spaces, comprising an air conditioned space Pa and a ventilated space Pb. The air conditioned space Pa located at lower part of the plant P is connected to the air conditioner AC, and the ventilated space Pb located at upper part of the plant P is not connected to the air conditioner AC. The open air outside of the plant is taken into the ventilated space Pb.

FIG. 6(C) shows a total air conditioning system adding to a partial air conditioning system. In the plant P, there is provided the air conditioner AC and an auxiliary air conditioner ACx, which is connected to a local booth Lb, such as a clean room or a homoiothermal room. The local booth Lb is air-conditioned only by the auxiliary air conditioner ACx.

In the case of the total air conditioning system as shown in FIG. 6(A), the pipes for the air conditioner are provided in the utility units 9 only at the uppermost and lowermost stories, and not provided at the intermediate stories.

In the case of the partial air conditioning system as shown in FIG. 6(B), the pipes for the air conditioner are provided in the utility units 9 only at the uppermost and lowermost stories in the air conditioned space. If the air conditioned space and the ventilated space are alternatively interchangeable, the pipes for the air conditioner are provided in the utility units 9 only at the uppermost and lowermost stories of both spaces Pa and Pb. As stated above, the pipes for the air conditioner can be modified in accordance with the type of air conditioning system.

Figure 7:
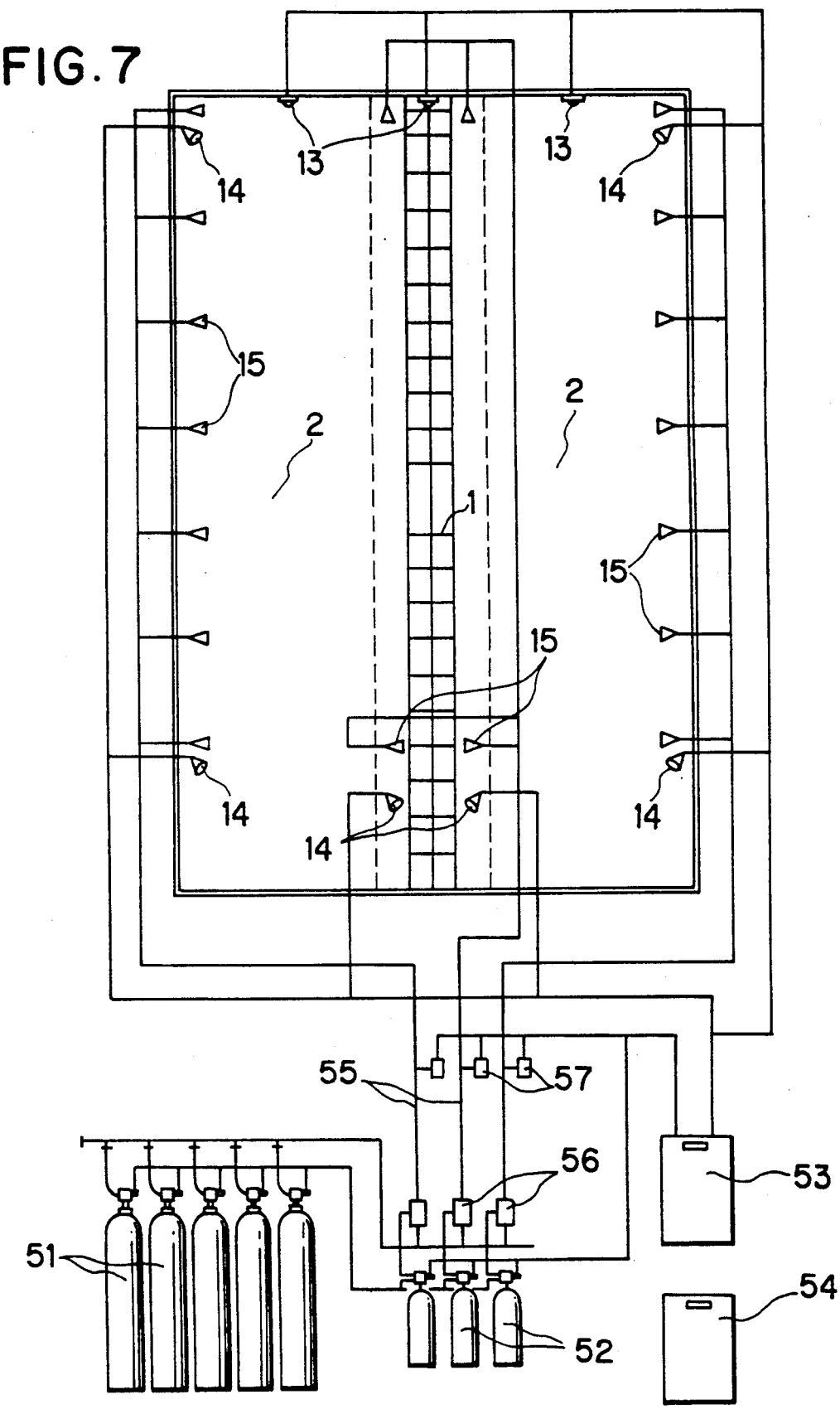
FIG. 7 is a schematic view showing a fire extinguishing system in the plant according to the first embodiment of the present invention.

FIG. 7 shows a Halon type of fire extinguishing system as an example of a fire extinguishing system in the three-dimensional manufacturing and assembly plant according to the present invention. In this example, ionic or photoelectric types of smoke detectors 13 are provided at the ceiling of the uppermost story of the assembly unit 2 and the uppermost part of the three-dimensional rack 1. Further, the terminal detecting portions (not shown) of the smoke detectors 13 are provided on each layer of the assembly units 2. The fire extinguishing system also has a plurality of Halon containers 51, a plurality of starting gas containers 52, a control board 53, a spare power supply 54, gas supplying pipes 55 with valves 56 and pressure switches 57. The Halon (polychlorotrifluoroethylene) gas is supplied from the Halon containers 51 into the plant by the gas supplying pipes 55 through valves 56.

When the smoke detector 13 is operated, the fire extinguishing system automatically begins to operate, so that alarms 14 sound sirens and the Halon gas is ejected from ejecting heads 15 to extinguish the fire.

In the above embodiment, the three-dimensional rack 1, the assembly unit 2, the stacking crane 6, the connecting unit 8, the utility unit 9 and other various structural units may be standardized into prefabricated units to construct the entirety of the plant having the most suitable scale corresponding to the manufacturing scale, thereby reducing construction costs and shortening the period of construction work.

It is preferable to enlarge the plant in a vertical direction or in a direction shown by arrow α in FIG. 1(C).

According to the first embodiment of the present invention, as described above in detail, the following effects are attainable.

(1) Since the floor surfaces are detachably provided, the assembly lines can be easily constructed three-dimensionally and modified two- or three-dimensionally. Further, since the floor members can be reduced to a minimum, the plant can be constructed economically.

(2) Since the floor surfaces of the assembly units are constructed by the panel members made of ventilative material, the number of air conditioners or the capacity of the air conditioner can be reduced. Therefore, the cost of equipment and the cost of maintenance can be decreased and the maintenance work can be easily performed. As to the air conditioning, since the air conditioning space of the plant, the outer surface area of the plant and the rooftop of the plant are small, the electrical load of the air conditioner can be reduced to 40 to 60% of that required for a one-storied plant. Additionally, the plant's design allows for effective natural ventilation. Moreover, it is possible to construct the total air conditioning system using convection of air in a large space.

(3) Since the floor surfaces of the assembly units are constructed by the panel members made of transparent material, the upper floor can command a view of all other floors, and visual monitoring of the assembly lines can be facilitated. In addition, lighting equipment is not required at each floor.

(4) Since the panel members are detachably provided in the assembly unit, a desired space can be formed by removing the panel members when carrying in or out the equipment to carry in or out the equipment through the space. In the case when the panel members to be removed are limited to the positions next to or nearby the actual setting location of the equipment, or in the neighborhood thereof, conveyance work of the panel members can be easily accomplished after the equipment is carried in or out of the workplace.

Incidentally, after carrying in or out the equipment, the panel members are preferably arranged above the spaces in order to avoid the fall of the equipment or workers.

(5) In the case when the partition walls are not provided between the three-dimensional rack and the assembly units, air can freely flow from the assembly units to the three-dimensional rack, thus improving air-conditioning efficiency. Further, the articles can be freely transferred at any place between the three-dimensional rack and the assembly units. As a result, the assembly lines can be easily modified on the assembly units.

A three-dimensional manufacturing and assembly plant according to a second embodiment of the present invention will be described below with reference to FIGS. 8 through 11.

Figure 8:
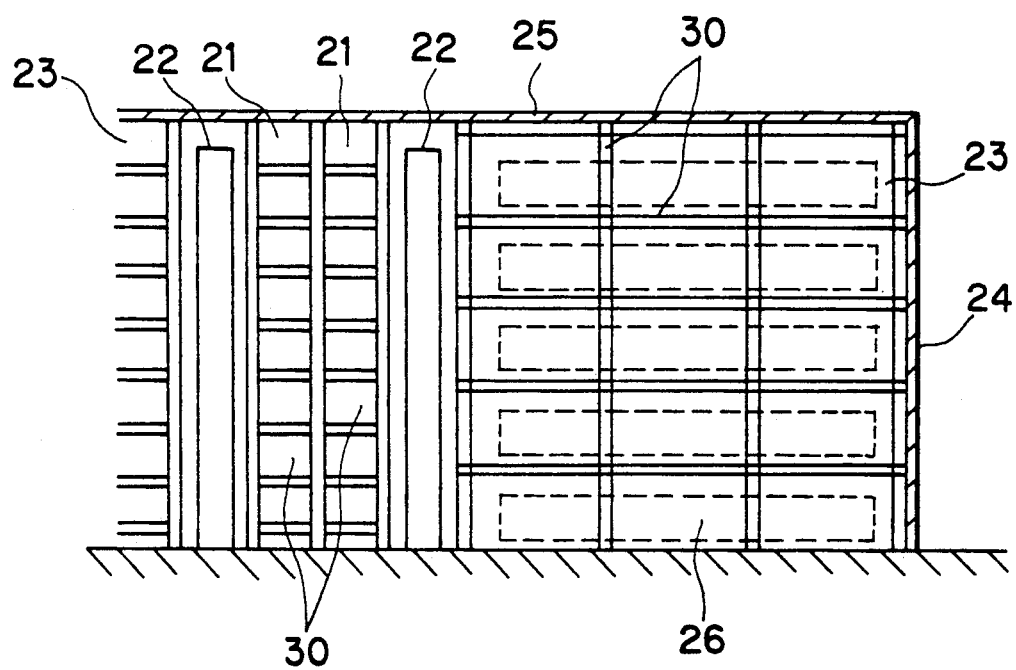
FIG. 8 is a cross-sectional view showing a three-dimensional manufacturing and assembly plant according to a second embodiment of the present invention.
Figure 9:
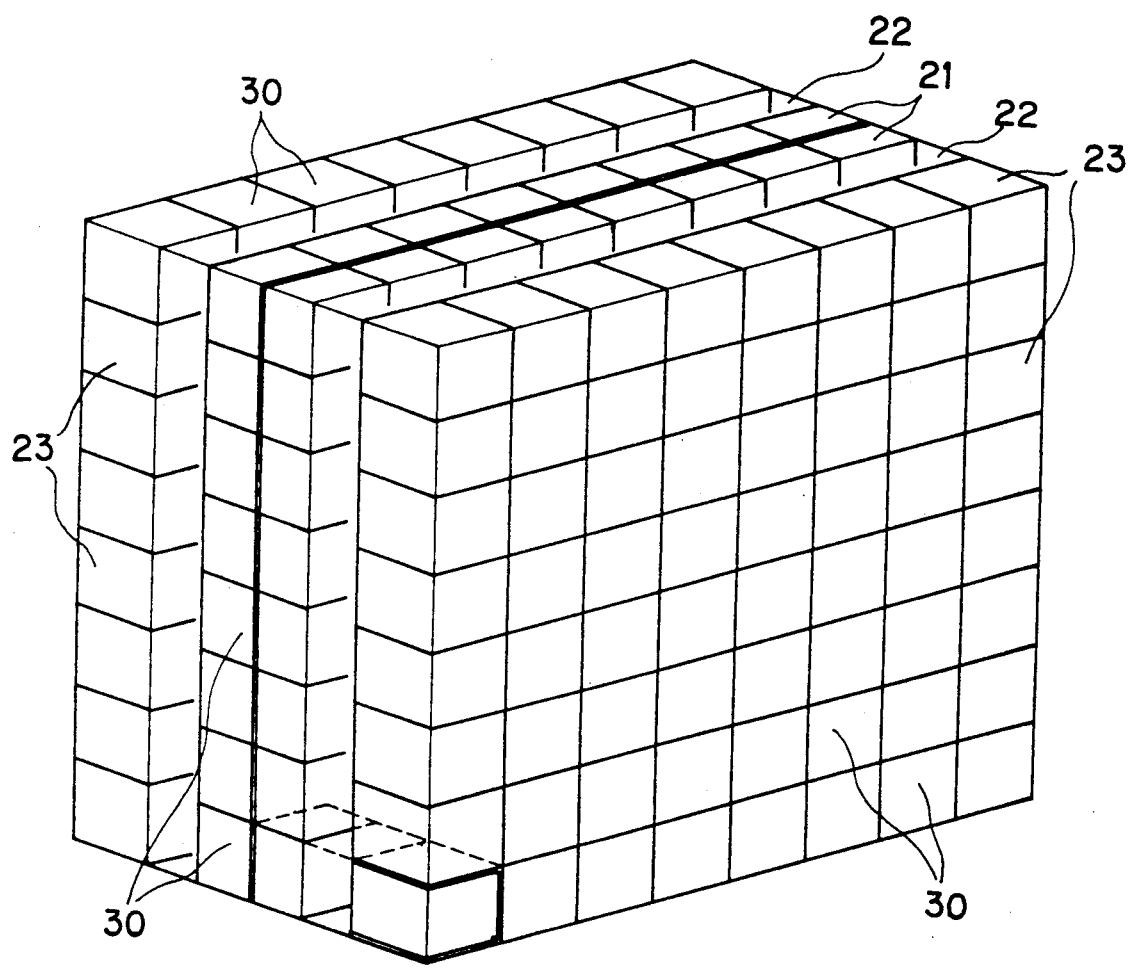
FIG. 9 is a perspective view showing the interior of the plant according to the second embodiment of the present invention.

FIG. 8 is a cross-sectional view showing the plant according to the second embodiment of the invention. FIG. 9 is a perspective view showing the interior of the plant shown in FIG. 8.

Those parts shown in FIGS. 8 through 11 which are structurally and functionally identical to those shown in FIGS. 1 through 7 are denoted with identical reference numerals.

As shown in FIGS. 8 and 9, two three-dimensional racks 21 are provided adjacent to each other at the central portion of the plant. Assembly line supporting structures 23 are provided on one side of the respective three-dimensional racks 21. Each assembly line supporting structure 23 is located in confrontation with the three-dimensional rack 21. Between each three-dimensional rack 21 and each assembly line supporting structure 23 there is provided a conveying device 22, which comprises a stacking crane or any other device having functions equal to the stacking crane in running, lifting and moving. The three-dimensional rack 21 and the assembly line supporting structure 23 are composed of a plurality of cubic modules 30. In this embodiment, the three-dimensional rack 21 is composed of 64 cubic modules 30 and the assembly line supporting structure 23 is composed of 64 cubic modules 30.

Figure 10:
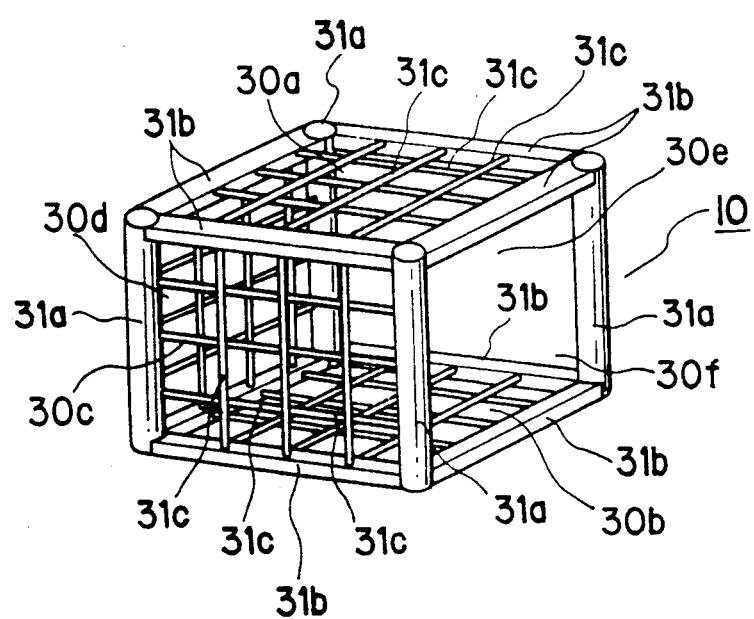
FIG. 10 is a perspective view showing a cubic module of the plant according to the second embodiment of the present invention.

The cubic module 30 is constructed in the form of a cubic lattice by assembling bar members 31, including first bar members 31a, second bar members 31b and third bar members 31c, each having a predetermined module, the bar member 31 comprising steel pipe or H-shaped steel beam or the like. Although not shown in the drawings, the bar members 31 are formed to be detachably connected with those of the adjacent cubic module 30 by using detachable flanges, bolts and nuts. The cubic module 30 shown in FIG. 10 is disposed adjacent to the outer wall (denoted at reference numeral 24 in FIG. 8) of the three-dimensional rack 21 or the assembly line supporting structure 23. In this cubic module 30 shown in FIG. 10, upper and lower sides 30a and 30b (corresponding to a ceiling and a floor) and two abutting lateral sides 30c, 30d (corresponding to outer walls) are constructed by a plurality of the third bar members 31c in the form of a lattice. The remaining two lateral sides 30e and 30f (the side next to the neighboring cubic module 30 and the side next to the conveying device 22) have no third bar member 31c and are open to allow the articles or the like to pass therethrough. In the other cubic modules 30 (not shown), upper and lower sides (corresponding to a ceiling and a floor) and one lateral side (corresponding to outer wall) are constructed by a plurality of the third bar members 31c in the form of a lattice, the remaining three sides (the two sides next to the neighboring cubic modules 30 and the side next to the conveying device 22) have no third bar members 31c and are open to allow the articles or the like to pass therethrough. Incidentally, the cubic module 30 having five sides in the form of a lattice and one open side next to the conveying device 22 may be used (not shown).

As mentioned above, if the bar member 31 is formed so as to have a predetermined module, the cubic module 30 can be easily constructed.

The three-dimensional racks 21 and the assembly line supporting structures 23, together with the conveying devices 22, are covered with the outer walls 24 and the roof 25 in order to form the exterior of the plant as shown in FIG. 8.

The upper and lower sides and the lateral sides in the form of a lattice of the cubic module 30 can be used without any modification, or they can be used with detachable ceiling, floor and wall material thereon.

On each layer of the assembly line supporting structures 23 there are provided an assembly line 26 which comprises an assembly conveyor 26a (free flow conveyor), a parts supplying conveyor 26b, an assembly robot 26c, and non-illustrated other devices such as inspecting robots or palletizing robots as shown in FIG. 11(A).

The above conveyors and robots are operated in accordance with a predetermined program. The parts required to be manufactured and assembled are taken out of the three-dimensional racks 21 by conveying devices 22.

In FIG. 11(A) panel members 26d (floor members) made of transparent and ventilative material, such as gratings, punching members, or netting members are detachably placed on the lower side (floor surface) of the cubic module 30.

If the equipment, such as the robots constituting the assembly line, or the articles under manufacture, are tall enough to contact the ceiling positioned above the tall equipment or the articles, the cubic module 30 positioned at the contact position can be replaced with a new module which is two stories in height. Therefore, such contact can be easily resolved. Even if modification of the assembly lines results in the necessity of rearranging the equipment, only the cubic modules 30 where the equipment would be installed are replaced with new ones. Therefore, the design of the modification can be easily effected.

Further, in order to transfer parts from the three-dimensional racks 21 to the assembly lines 26, or to store the half-processed articles under manufacture and the finished articles assembled and manufactured on the assembly lines 26 in the three-dimensional racks 21, the conveying devices 22, such as a stacking crane, are provided between the three-dimensional racks 21 and the assembly line supporting structures 23 in a manner such that the conveying devices can freely move therebetween in horizontal and vertical directions. At this time, since there is no partition wall between the cubic module 30 and the conveying device 22 to allow the articles to pass therethrough, the conveying devices 22 can be stopped at any position to transfer the articles. If the half-processed articles or the finished articles are required by the following process of the assembly line 26, they are transferred to the following process of the assembly line 26 without being temporarily stored in the three-dimensional racks 21. If the following process is arranged at the location adjacent to the previous process, the half-processed articles or the finished articles are conveyed and transferred by the conveyor different from the conveying device 22.

At the time of shipping, the half-processed articles under manufacture or the finished articles stored in the three-dimensional racks 21 are taken out of the three-dimensional racks 22 and conveyed to an exit for articles, and then shipped.

If a large amount of articles are received or shipped, some special conveying devices which are exclusively used for receiving or shipping may be installed between the three-dimensional racks 21.

Figure 11B:
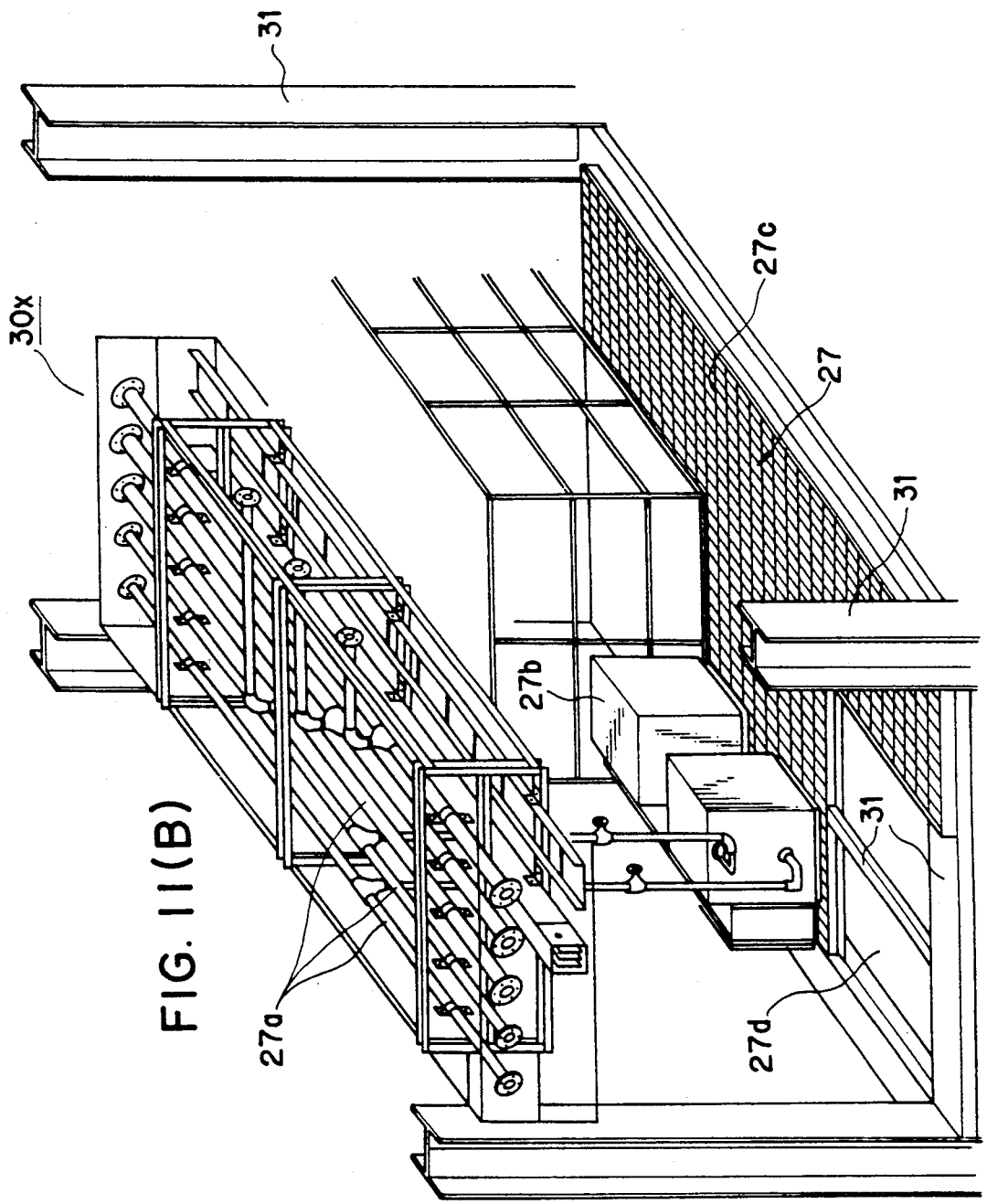
Figure 12:
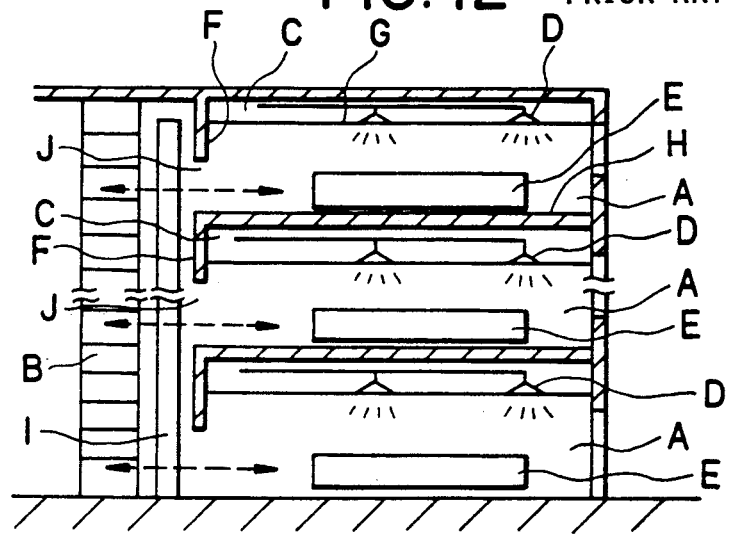
FIG. 12 is a schematic cross-sectional view showing a conventional high-rise plant.
Figure 13:
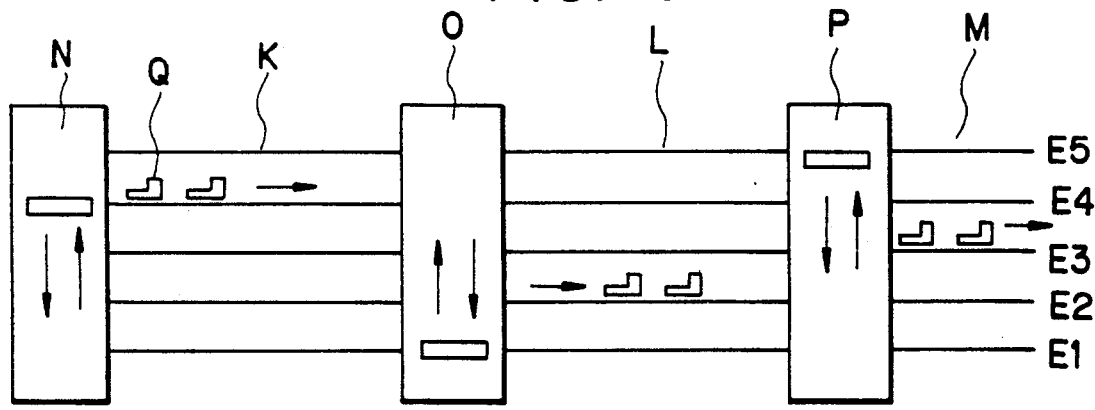
FIG. 13 is a schematic cross-sectional view showing a conventional high-rise plant.

Around each layer of the assembly line supporting structure 23, there are provided utility units 27 in which various pipes 27a, including pipes for air conditioners and pipes for cold and hot water, a control board 27b, and ventilation equipment including conduits and ducts are highly concentrated as shown in FIG. 11(B). The utility unit 27 is also provided with a passage 27c for maintaining various equipment in the utility unit 27 and various equipment in the assembly line supporting structure 23.

The utility unit 27 may be constructed using the exclusive cubic module 30x as shown in FIG. 11(B). The cubic modules 30x may be disposed around the cubic modules 30 shown in FIG. 9. Alternatively, the utility unit may be constructed using a part of the outer periphery of the cubic module 30 shown in FIG. 9.

The passage 27c comprises panel members made of transparent and ventilative material such as gratings, punching members or netting members as with the panel members 26d in the assembly line 26, and the panel members are detachably installed. The panel members are removed to form a free space 27d as shown in FIG. 11(B). The free space 27d serves as a passage for passing through the equipment which is carried in or out and transferred vertically.

In this embodiment thus constructed, since various pipes or ducts, and the control board, are highly concentrated on the utility unit, extension, reconstruction, or modification of the manufacturing equipment can be easily performed, and maintenance or inspection of the various pipes and the control board or the like can be easily performed.

Since the three-dimensional racks 21, assembly line supporting structures 23, and the utility unit 27 are constructed in a manner such that they can be freely assembled or dismantled, the plant scale can be easily enlarged or reduced. That is, the most suitable plant corresponding to manufacturing scale can be constructed only by increasing or decreasing the number of the cubic modules 30.

With the structure as shown in FIGS. 8 through 11, the assembly lines which are structurally and functionally identical to those shown in FIGS. 3 and 4 can be constructed.

Further, an example of a flow of a physical distribution for manufacturing in the three-dimensional manufacturing and assembly plant is identical to that shown in FIG. 5.

Furthermore, an air conditioning system and a fire extinguishing system can be constructed which are structurally and functionally identical to those shown in FIGS. 6 and 7.

In the above embodiment, because the cubic modules 30 and 30x can be standardized into the same size and shape, the overall plant can be constructed and dismantled in accordance with the manufacturing scale. An overall plant having the most suitable scale corresponding to the manufacturing scale can be constructed, to thereby reduce construction costs and shorten the period of construction work.

The plant can be easily enlarged in a vertical direction, right and left directions, and front and rear directions.

In the above embodiment, though a plurality of the cubic modules 30 are used to construct the plant, in case of a small plant having a small manufacturing scale, one or two cubic modules having a large size may be used to construct the plant. Further, only the assembly line supporting structures 23 are constructed using the cubic modules 30. The three-dimensional racks 21 can be constructed integrally, as well as the three-dimensional rack 1 according to the first embodiment of the present invention.

According to the second embodiment of the present invention, as described above in detail, next effects are attainable.

(1) Since the assembly line supporting structure can be freely constructed in the form of a cubic lattice and dismantled, the assembly lines can be easily enlarged, reduced and modified two- or three-dimensionally. Further, since the cubic module is of a cubic lattice, the plant can be constructed economically using a plurality of the cubic modules.

(2) Since the assembly line supporting structure has a ventilative structure, the number of air conditioners or the capacity of the air conditioner can be reduced. Therefore, the cost of equipment and the cost of maintenance can be decreased and the maintenance work can be easily performed. Further, since the air conditioning space of the plant, the outer surface area of the plant and the rooftop of the plant are small, the electric load of the air conditioner can be reduced to 40 to 60% of that required for a one-storied plant. Additionally, the plant's design allows for effective natural ventilation. Moreover, it is possible to construct the total air conditioning system using convection of air in a large space.

(3) Since the cubic modules for constructing the assembly line supporting structure are transparent, the upper floor can command a view of all other floors, and visual monitoring of the assembly lines can be facilitated. In addition, lighting equipment is not required at each floor.

(4) Since the cubic modules are formed in the form of a cubic lattice, a desired space can be formed between two lattices to thereby carry in or out the equipment through the space.

(5) In the case when both three-dimensional rack and assembly line supporting structure are constructed by cubic modules, air can freely flow from the assembly line supporting structure to the three-dimensional rack, thus improving air-conditioning efficiency. Further, the articles can be freely transferred at any place between the three-dimensional rack and the assembly line supporting structure. As a result, the assembly lines can be easily modified in the assembly line supporting structure.

Although certain preferred embodiments have been shown and described, it should be understood that many changes and modifications may be made therein without departing from the scope of the appended claims.

What is claimed is:

1. A three-dimensional manufacturing and assembly plant, comprising:

a three-dimensional high-rise rack provided at a center portion of the plant and having a plurality of shelves for storing articles, said shelves being disposed at a plurality of different vertical layers;

a number of assembly units disposed in a plurality of different vertical layers provided on both sides of said three-dimensional rack so as to define a relatively long and narrow space therebetween on both sides of said three-dimensional rack, said assembly units on both sides of said three-dimensional rack being provided for supporting assembly lines, each of said assembly units including a plurality of frame members arranged lengthwise and crosswise and a floor, wherein at least a portion of said floor of each said assembly unit is detachably and removably disposed on said frame members of said assembly unit and made of panel members having an open lattice structure such that said panel members are transparent and ventilative; and a stacking crane provided in a said space between said three-dimensional rack and said assembly units to be freely movable therebetween in horizontal and vertical directions so as to transfer articles therebetween.

2. The three-dimensional manufacturing and assembly plant according to claim 1, wherein said assembly units and said three-dimensional rack have sides adjacent to each other which are open ended so that articles can be freely transferred between said assembly units and said three-dimensional rack.

3. The three-dimensional manufacturing and assembly plant according to claim 1, and further comprising a plurality of utility units provided adjacent to said assembly units for receiving air-conditioning equipment, water supply equipment, a control board for controlling equipment and ventilation equipment.

4. The three-dimensional manufacturing and assembly plant according to claim 1, wherein said assembly units and said three-dimensional rack are open ended on sides adjacent to each other so that articles can be freely transferred therebetween by said stacking crane; and
    said plant further comprising a plurality of utility units adjacent said assembly units for air-conditioning, water supply and ventilation equipment and a control board for controlling equipment.

5. The three-dimensional manufacturing and assembly plant according to claim 1, wherein said panel members are made of one of gratings, stamped members and netting members.

6. A three-dimensional manufacturing and assembly plant, comprising:
    a three-dimensional high-rise rack provided at a center portion of the plant and having a plurality of shelves for storing articles, said shelves being disposed at a plurality of different vertical layers;
    an assembly line supporting structure provided on both sides of said three-dimensional rack for supporting assembly lines so as to define a relatively long and narrow space between said assembly line supporting structure and said three-dimensional racks on both sides of said three-dimensional rack, said assembly line supporting structure comprising a plurality of cubic modules detachably arranged in a plurality of vertical layers; and
    a stacking crane provided in a said space between said three-dimensional rack and said assembly line supporting structure to be freely movable therebetween in horizontal and vertical directions so as to transfer the articles therebetween;
    wherein each of said cubic modules has horizontal and vertical bar members arranged in the form of a cubic lattice, floor members and means for detachably mounting upper and lower said floor members on said horizontal bar members for forming upper and lower floors adapted to support a plurality of assembly lines thereon in a vertically spaced relationship, each said floor member having an open lattice structure such that said floor members are transparent and ventilative.

7. The three-dimensional manufacturing and assembly plant according to claim 6, wherein said assembly line supporting structure and said three-dimensional rack have sides adjacent to each other which are open ended so that articles can be freely transferred between said assembly line supporting structure and said three-dimensional rack.

8. The three-dimensional manufacturing and assembly plant according to claim 6, and further comprising a utility unit provided adjacent to said floor of said cubic lattice of said assembly line supporting structure for pipes for air-conditioning and supplying water, a control board for controlling equipment, and ventilation equipment.

9. The three-dimensional manufacturing and assembly plant according to claim 6, wherein said floor members forming said floors are made of one of gratings, stamped members and netting members.

10. A three-dimensional manufacturing and assembly plant, comprising:
    a storage section comprising a three-dimensional high-rise rack having a plurality of shelves, said shelves being disposed in a plurality of vertically spaced layers;
    an assembly section comprising means for supporting and housing a plurality of vertically tiered manufacturing assembly lines, said means including a plurality of assembly spaces vertically tiered on both sides of said three-dimensional rack so as to define a relatively long and narrow space between said assembly section and said three-dimensional rack on both sides of said three-dimensional rack, each said assembly space comprising structural members defining said assembly space, and said assembly spaces having respective floors, at least a portion of each said floor comprising a floor member detachably mounted to said structural members each said floor member having an open lattice structure such that said floor members are transparent and ventilative; and
    means provided in a said space between said storage section and said assembly section freely moveable between said three-dimensional rack and said assembly section in horizontal and vertical directions for transferring articles therebetween, said means comprising a stacker crane.

11. The plant of claim 10, wherein said assembly spaces are vertically tiered and horizontally interconnected so as to surround said three-dimensional rack.

12. The plant of claim 10, wherein at least one staircase interconnects each vertical tier of said assembly spaces.

13. The plant of claim 10, wherein said structural members of each said assembly space comprises a plurality of frame members arranged lengthwise and crosswise and defining an assembly unit.

14. The plant of claim 13, wherein said assembly units and said three-dimensional rack have sides adjacent to each other which are open ended so that articles can be freely transferred between said assembly unit and said three-dimensional rack.

15. The plant of claim 13, wherein said assembly section further comprises means for receiving air-conditioning equipment, water supply equipment, a control board for controlling equipment and ventilation equipment, said means for receiving comprising a plurality of utility units provided adjacent to said assembly units.

16. The plant of claim 10 wherein:
    said assembly spaces are detachably arranged cubic modules; and
    each said cubic module comprises horizontal and vertical bar members arranged in the form of a cubic lattice, said structural members comprising said horizontal and vertical bar members.

17. The plant of claim 16, wherein said assembly section and said three-dimensional rack are open ended on sides adjacent to each other so that articles can be freely transferred between said assembly section and said three-dimensional rack.

18. The plant of claim 16, wherein said assembly section further comprises means for receiving air-conditioning equipment, water supply equipment, a control board for controlling equipment and ventilation equipment, said means for receiving comprising a plurality of utility units provided adjacent to said cubic modules.

19. The three-dimensional manufacturing and assembly plant according to claim 16, wherein said floor members forming said floors are made of one of gratings, stamped members and netting members.

20. The three-dimensional manufacturing and assembly plant according to claim 10, wherein said floor members forming said floors are made of one of gratings, stamped members and netting members.

* * * * *